Jan. 27, 1953  J. F. ROMANS  2,626,532
CUTTING TOOL MOUNTING AND METHOD OF MAKING
Filed Nov. 21, 1951

INVENTOR.
JOHN F. ROMANS
BY
Oberlin + Limbach
ATTORNEYS.

Patented Jan. 27, 1953

2,626,532

UNITED STATES PATENT OFFICE 2,626,532

CUTTING TOOL MOUNTING AND METHOD OF MAKING

John F. Romans, North Royalton, Ohio, assignor to The Motch & Merryweather Machinery Company, Cleveland, Ohio, a corporation of Ohio Application November 21, 1951, Serial No. 257,600

4 Claims. (Cl. 76—101)

This invention relates as indicated to cutting tools such as milling cutters, reamers and various metal working tools of similar nature, and means for detachably and adjustably securing the cutting elements in appropriate holders.

As disclosed in Patents No. 1,938,717 to C. J. Oxford and No. 1,938,718 to C. J. Oxford et al., the blades or teeth of milling cutters, for example, may be provided with a pattern of truncated pyramidal recesses adapted to engage and interlock with complementary pyramidal protuberances formed in the backs of slots circumferentially arranged in the periphery of the cutter body or holder. Wedge means may be utilized to lock the blades in place within their respective slots. This type of mounting permits the adjustment of the individual blades to compensate for wear or grinding since they may be removed from their respective slots or grooves and relocated as desired, the interlocking protuberances and depressions serving to prevent any shifting of the blade either radially or axially of the tool when once wedged in place. This has been found to be far superior to reliance upon mere frictional securing of the blades, as by wedges and the like.

The manufacture of cutting tools of this type, however, poses certain problems, and it has been conventional to form the recessed or socketed face of the blade by hot forging and to machine the corresponding projections or protuberances in the complementary face of the slot. Hot forging of the recesses or sockets in the blade is not entirely satisfactory, however, since it is very difficult thereby to obtain the precise form and dimensions necessary if the pyramidal faces of the sockets and protuberances are to interfit flush with one another. Moreover, hot rolling is ordinarily not a desirable operation to perform on tool steel as it is likely to damage the structure of the latter.

It is accordingly a principal object of my invention to provide a method of forming accurately interfitting surfaces on cutting tool blades and the supports or holders therefor.

Another object is to provide a method of manufacturing such cutters which is both inexpensive and accurate and will not damage the tool steel of the blade.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
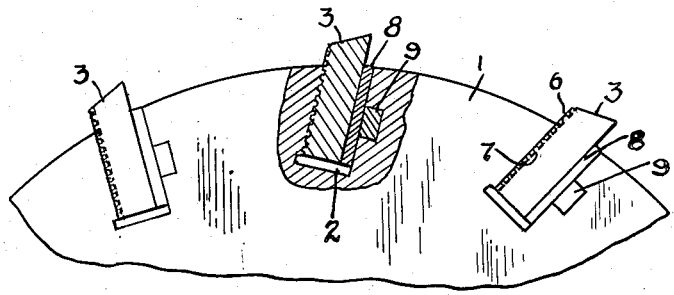
Fig. 1 is a fragmentary side elevational view of a milling cutter utilizing removable and adjustable teeth or blades in accordance with this invention.

Referring now more particularly to the annexed drawing and especially Fig. 1 thereof, such figure shows a portion of the body 1 of a rotary milling cutter having notches 2 therein in which the cutter blades 3 are retained. Such blades or teeth 3 may have outer beveled edges 4 and lateral beveled edges 5 in the case of a face milling cutter. The rear faces 6 of the teeth are formed with a pattern of small sockets as described below to interengage with complementary protuberances on the corresponding faces 7 of the notches 2. When the teeth have been properly positioned in such notches or slots, spaced blocks 8 are inserted between the forward faces of such teeth and the corresponding faces of the notches and wedges 9 driven home firmly to secure the teeth. Various other types of wedge and screw means are well known in the art for the purpose of similarly securing inserted teeth in cutting tools.

Figure 2:
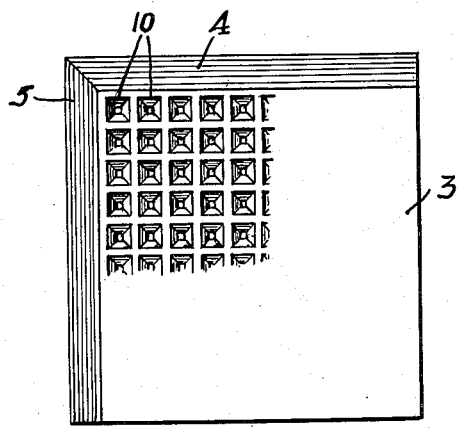
Fig. 2 is an enlarged detail view of one such blade showing the socketed face adapted to interengage with the complementary face of the groove in which such blade is seated.
Figure 3:
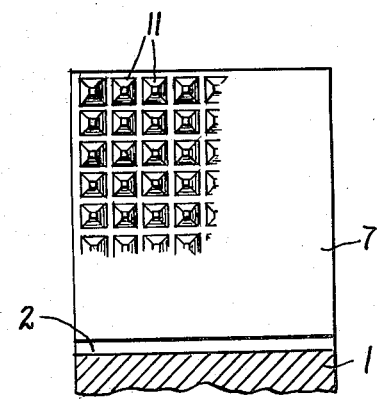
Fig. 3 is an enlarged detail view of such complementary face of such groove.

As shown in Fig. 2, the rear face of each blade or tooth 3 is formed with a symmetrical pattern of sockets 10 preferably of truncated pyramidal form in longitudinal and transverse alignments. The corresponding face 7 of each notch 2 is formed with a corresponding symmetrical pattern of complementary truncated pyramidal protuberances 11 adapted exactly to interengage sockets 10. Obviously, each tooth 3 may be adjusted either laterally or radially outwardly and then locked in such adjusted position. The tooth is very firmly seated in its respective notch and cannot possibly be displaced in use. The interengaging sockets and protuberances are more sufficient to resist all stresses and strains tending thus to displace the tooth, and accordingly blocks 8 and wedges 9 are not called upon to serve any function other than merely to maintain such interengagement of the mating faces of the teeth and notches.

The protuberances 11 may be formed by employment of an appropriate broach, and no great difficulty is encountered in producing the same to quite close tolerances. The formation of the sockets 10 in the teeth or blades 3 is another matter, however, and prior art methods of producing the same have not been entirely satisfactory. It will be appreciated that if the opposed faces 6 and 7 are to mate properly, the sockets 10 should be very precisely formed to mate exactly with the protuberances 11. Otherwise there may be a possibility of a slight degree of play, or the tooth may be slightly canted in its notch. Hot forging of the socketed face is undesirable for the reasons mentioned above and in addition, the desired dimension tolerances are difficult, if not impossible, to maintain.

Figure 4:
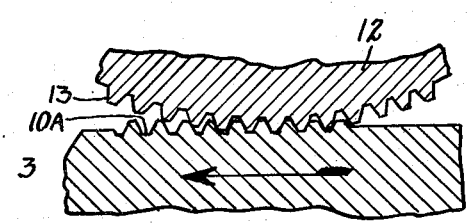
Fig. 4 is a semi-diagrammatic cross-sectional view illustrating a preliminary forming operation in thus forming the sockets in such blade.

As illustrated in semi-diagrammatic manner in Fig. 4, I cold-roll the face of the tooth blank 3 with a roller die 12 having protuberances 13 on its peripheral surface exactly corresponding to the protuberances 11 on the faces of notches 2. While this requires the imposition of very heavy pressure during the rolling process, the structure of the tool steel of which tooth 3 is composed is not damaged by such operation. The sockets 10A thus formed will, however, not exactly correspond to such protuberances 13 or 11 but will be marred or distorted by the rolling action of roll die 12 even though the latter will desirably be of relatively large diameter.

Figure 5:
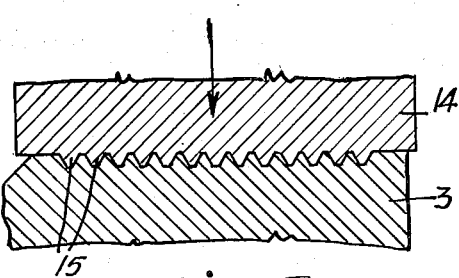
Fig. 5 is a semi-diagrammatic cross-sectional view illustrating the final coining operation utilized to finish and true such sockets.

I next subject the preformed tooth blank 3 to a coining operation as semi-diagrammatically illustrated in Fig. 5, utilizing a die 14 subjected to pressure in a direction normal to the socketed face of the tooth. Such die is provided with a pattern of protuberances 15 exactly corresponding in all dimensions to protuberances 11 and the distorted sockets 10A produced in the preceding rolling operation are thereby trued. Such subsequent coining operation is made possible despite the hard tool steel utilized for such tooth since only a relatively slight additional deformation of the tooth blank is required to be produced thereby. The sockets or indentations now will make a perfect fit with protuberances 11. Preferably the tooth blank 3 will not have been given its final hardening treatment until after such coining operation.

It will thus be seen that I have provided a method of forming interengaging sockets and protuberances on the corresponding teeth and notches of inserted tooth milling cutters and like rotary tools making practical this type of interlocking means whereby the teeth may be adjusted both axially and radially of the tool and yet locked firmly in place during use of the tool. The structure of the tool steel forming the blade is not damaged by the operations performed thereon in accordance with my invention, and the dimensions and contours of the protuberance-engaging sockets are formed to such close tolerances that they perfectly interengage such corresponding protuberances with face-to-face contact rather than point-and-line contacts. The resultant rotary tool is correspondingly superior in respect to the strength of the teeth mounts, the trueness of such teeth, and the ease with which the latter may be adjusted.

Other modes of applying the principle of the invention may be employed, change being made as regards the details described, provided the features stated in any of the following claims or the equivalent of such be employed.

I therefore particularly point out and distinctly claim as my invention:

1. The method of forming a tooth for inserted-tooth rotary cutting tools such as milling cutters and the like which includes the steps of cold rolling a symmetrical pattern of truncated pyramidal shaped sockets in one face of such tooth, then performing a coining operation normal to such face to true such sockets to identical dimensions and contours, and thereafter hardening such tooth.

2. The method of forming a tooth for inserted-tooth rotary cutting tools such as milling cutters and the like which includes the steps of cold rolling a uniform symmetrical pattern of truncated pyramidal shaped sockets in a plurality of alignments in one entire face of such tooth parallel and transversely to the length of such tooth, then performing a coining operation normal to such face to true such sockets to identical dimensions and contours, and thereafter hardening such tooth.

3. The method of forming a tooth for inserted-tooth rotary cutting tools such as milling cutters and the like which includes the steps of cold rolling a plurality of like sockets in one face of such tooth, and then performing a coining operation normal to such face to true such sockets to identical dimensions and contours.

4. The method of forming an inserted-tooth rotary cutter which comprises notching the periphery of the cutter body, broaching a plurality of identical truncated pyramidal protuberances on one generally radial face of each such notch, such protuberances being arranged in a pattern of uniform alignments, cold rolling a corresponding face of each such tooth to form a complementary set of sockets, performing a coining operation normal to such latter face to true such sockets perfectly to complement such protuberances with such faces in contact, thereafter hardening such tooth, inserting such teeth in such notches with such protuberances and sockets thus interengaged, and securing such teeth to maintain such interengagement.

JOHN F. ROMANS.

No references cited.